United States Patent
Enomoto et al.

(10) Patent No.: US 7,148,809 B2
(45) Date of Patent: *Dec. 12, 2006

(54) SEAT BELT CONNECTOR ASSEMBLY

(75) Inventors: Takayuki Enomoto, Tokyo (JP); Naobumi Kuboki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/054,078

(22) Filed: Feb. 8, 2005

(65) Prior Publication Data

US 2005/0146197 A1 Jul. 7, 2005

Related U.S. Application Data

(62) Division of application No. 10/090,037, filed on Feb. 27, 2002, now Pat. No. 6,866,342.

(30) Foreign Application Priority Data

Mar. 28, 2001 (JP) ............... 2001-91607

(51) Int. Cl.
*G08B 21/00* (2006.01)
(52) U.S. Cl. ............... 340/686.1; 340/457.1; 116/212; 297/482
(58) Field of Classification Search ........ 297/482, 297/483, 473, 468, 464, 485, 486; 280/808, 280/801.2, 801.1, 806; 296/65.03, 64, 63, 296/65.01; 116/208, 212, 203; 340/686.1, 340/457.1
See application file for complete search history.

(56) References Cited

U.S. PATENT DOCUMENTS

| 4,253,702 | A | 3/1981 | Lehr |
| 4,328,714 | A | 5/1982 | Spinosa et al. |
| 4,454,831 | A | 6/1984 | Gallo |
| 4,611,854 | A | 9/1986 | Pfeiffer |
| 4,893,835 | A | 1/1990 | Linden |
| 5,556,171 | A | 9/1996 | Busch |
| 5,681,094 | A | 10/1997 | Brown et al. |
| 5,730,499 | A | 3/1998 | Salisbury, Jr. |
| 6,016,985 | A | 1/2000 | Sung |
| 6,211,793 | B1 | 4/2001 | Smithson |
| 6,520,588 | B1 | 2/2003 | Busch |

FOREIGN PATENT DOCUMENTS

| EP | 0 997 358 A | 5/2000 |
| WO | WO 98/51545 | 11/1998 |
| WO | WO 99/27337 | 6/1999 |

*Primary Examiner*—Daryl C Pope
(74) *Attorney, Agent, or Firm*—Knobbe, Martens, Olson & Bear, LLP

(57) ABSTRACT

A seat belt connector assembly is provided with a seat belt anchor adapted to be coupled to a passenger seat and a cover for accommodating an upper part of the seat belt anchor. The seat belt anchor and the cover, which are relatively movable, are each formed with a seat-belt insertion hole permitting a seat belt to pass therethrough, and are formed with a mark and a through hole, respectively. When the desired relative position permitting the desired tension force to be applied to the seat belt is established between the seat belt anchor and the cover, the mark is made visible through the through hole.

6 Claims, 5 Drawing Sheets though, and the cover has a seat-belt insertion hole which is permitted to be aligned with the seat-belt insertion hole of the seat belt anchor and which permits the seat belt to pass therethrough. The seat belt connector assembly further comprises relative-position indicating means for indicating a relative position between the seat belt anchor and the cover. The relative position varies with the change in a tension force applied to the seat belt.

SEAT BELT CONNECTOR ASSEMBLY

RELATED APPLICATION

This application is a divisional and incorporates by reference in its entirety U.S. application Ser. No. 10/090,037, filed Feb. 27, 2002 now U.S. Pat. No. 6,866,342.

BACKGROUND OF THE INVENTION

1. Technical Field

The present invention relates to a seat belt connector assembly for fixing a seat belt to a passenger seat in a vehicle, and more particularly, to a seat belt connector assembly permitting a seat belt to be applied with a sufficient tension large enough to restrain a child seat in a passenger seat.

2. Related Art

A vehicle is generally provided with a seat belt system for restraining a passenger in a passenger seat. The seat belt system typically comprises a three-point seat belt and a retractor, provided at a lower portion of a center pillar, for storing an unused length of the seat belt. The seat belt extends upwardly from the retractor along the center pillar and then extends downward after changing its extending direction at a belt anchor attached to the center pillar. As exemplarily shown in FIG. 1, the seat belt 1 is fixed at its distal end to one side of a seat cushion 3 through a seat belt connector assembly 2 and a fastening belt 5, and is provided at its intermediate portion with a tongue plate 1*b*, which is adapted to be coupled to a belt buckle 4 fixed to another side of the seat cushion 3.

When using the seat belt, a seated passenger pulls the seat belt 1 to extend diagonally and downwardly in front of the torso of the passenger, and couples the tongue plate 1*b* to the belt buckle 4. Thus, the torso and hip of the seated passenger are restrained by a shoulder belt portion 1*c* and a lap belt portion 1*a* of the seat belt 1, respectively.

As exemplarily shown in FIG. 2, the seat belt connector assembly 2 is composed of a molded plastic product 7 in which a metal plate 6 is embedded. The metal plate 6 is formed with a seat-belt insertion hole 8 and a fastening-belt insertion hole 9 which individually permit the seat belt 1 and the fastening belt 5 to pass therethrough.

The seat belt system for restraining a passenger may be also utilized to restrain a so-called child seat in a passenger seat. In such a case, the seat back and seat cushion of the child seat (denoted at reference numeral 30 and shown by one-dotted chain line in FIG. 1) may be restrained by the shoulder and lap belt portions 1*c*, 1*a* of the seat belt 1, respectively. On this occasion, the child seat 30 must be securely restrained by the seat belt 1 applied with a sufficient tension. However, it is difficult for a user to determine whether a sufficient tension is applied to the seat belt 1.

SUMMARY OF THE INVENTION

An object of the present invention is to provide a seat belt connector assembly which permits a user to easily make a judgement as to whether a sufficient tension is applied to a seat belt for restraining a passenger or a child seat in a passenger seat.

A seat belt connector assembly according to the present invention comprises a seat belt anchor adapted to be coupled to a passenger seat, and a cover for accommodating at least part of the seat belt anchor so that the seat belt anchor and the cover are relatively movable. The seat belt anchor has a seat-belt insertion hole permitting a seat belt to pass therethrough, and the cover has a seat-belt insertion hole which is permitted to be aligned with the seat-belt insertion hole of the seat belt anchor and which permits the seat belt to pass therethrough. The seat belt connector assembly further comprises relative-position indicating means for indicating a relative position between the seat belt anchor and the cover. The relative position varies with the change in a tension force applied to the seat belt.

The seat belt connector assembly of the present invention is useable after the seat belt anchor of the assembly is coupled to a passenger seat and a seat belt is inserted through the seat-belt insertion holes of the seat belt anchor and the cover. While a user is utilizing the seat belt to restrain a child seat or the seated user in the passenger seat, a relative position between the seat belt anchor and the cover is indicated by the relative-position indicating means. On the basis of the indication of the relative position given by the relative-position indicating means, the user is enabled to easily make a judgement as to whether a sufficient tension force has been applied to the seat belt, i.e., whether the child seat or the seated user has been securely restrained in the passenger seat.

DETAILED DESCRIPTION

With reference to FIGS. 3–11, a seat belt connector assembly according to an embodiment of the present invention will be explained.

Figure 1:
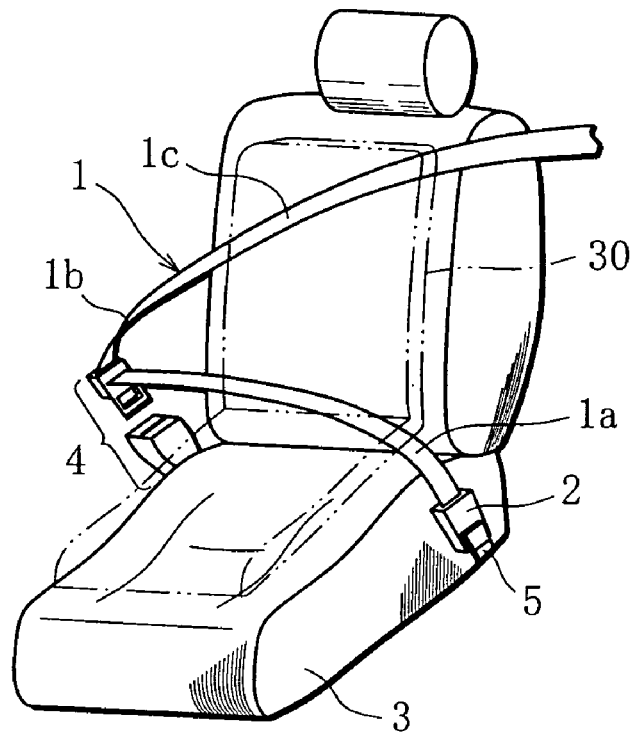
FIG. 1 is a perspective view exemplarily showing a seat belt having one end thereof fixed to a passenger seat through a conventional seat belt connector assembly.

The seat belt connector assembly of this embodiment is suitable for a seat belt system such as the system shown in FIG. 1, which system is utilized to restrain a passenger or a child seat in a passenger seat.

Figure 3:
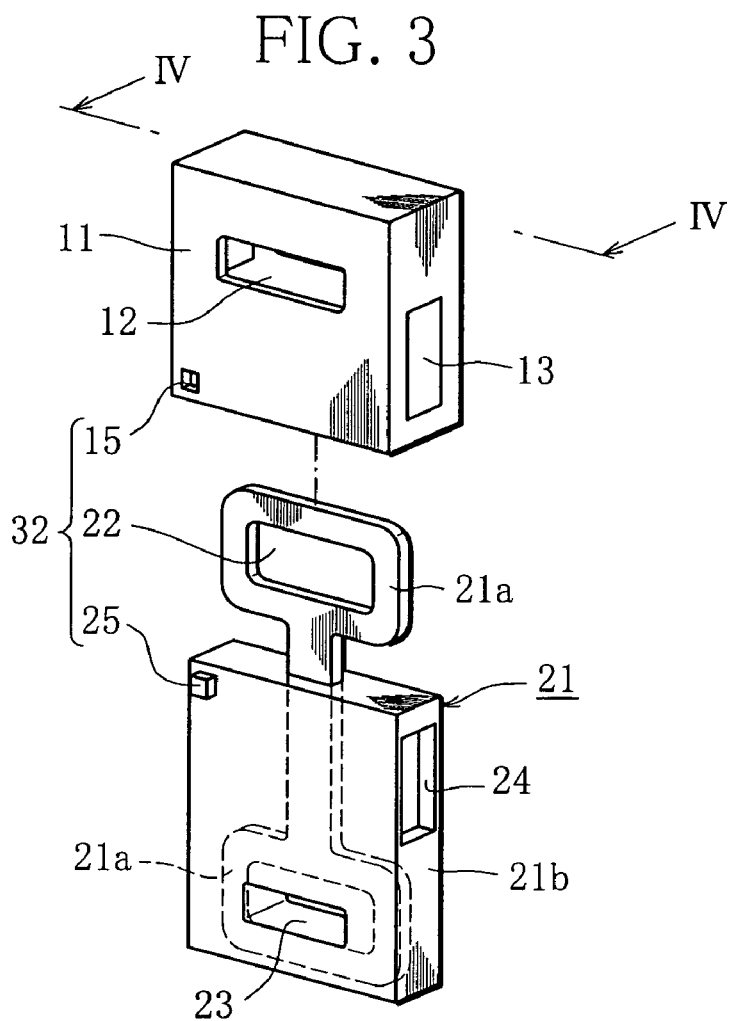
FIG. 3 is an exploded perspective view showing a seat belt connector assembly according to an embodiment of the present invention.

As shown in FIG. 3, the connector assembly comprises a cover 11 and a seat belt anchor 21 having an upper half thereof received in the cover 11. The cover 11 and the seat belt anchor 21 are arranged to be relatively movable.

Figure 4:
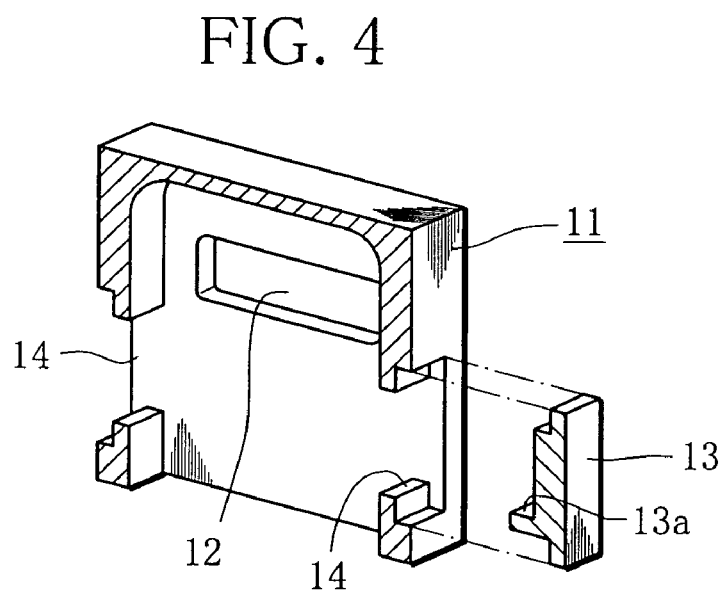
FIG. 4 is an exploded perspective view, as seen from the line IV—IV in FIG. 3, showing part of a cover of FIG. 3.
Figure 5:
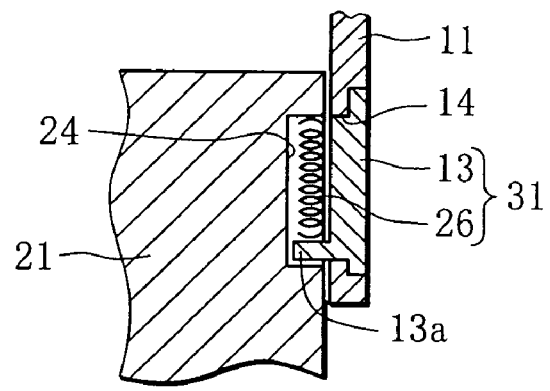
FIG. 5 is a fragmentary section view showing a seat belt anchor of FIG. 3, with the seat belt anchor received in the cover.

The cover 11 has front, rear, right and left walls and a top wall, and is formed into a box shape having an open bottom. The front and rear walls of the cover 11 are formed with seat-belt insertion holes, respectively. As shown in FIGS. 4 and 5, the left and right walls of the cover 11 are formed with stepped through holes 14, respectively, into which fitting members 13 are fitted. Each fitting member 13 is formed at its upper and lower end portions with stepped portions. Further, the lower end portion of the fitting member 13 is provided with a projection 13a which extends inwardly and horizontally from the fitting member 13. Moreover, a through hole 15 is formed in a lower left corner of the front wall of the cover 11.

The seat belt anchor 21 is comprised of a seat belt anchor body 21a made of, e.g., a metal plate, and a molded plastic product 21b in which a lower half of the anchor body 21a is embedded. The seat belt anchor body 21a is comprised of upper and lower halves of a square ring shape and a connecting portion through which the upper and lower halves are connected to each other. The upper and lower halves of the anchor body 21a are individually formed with a seat-belt insertion hole 22 and a through hole 23, e.g., by stamping. The molded plastic product 21b is provided with a through hole, corresponding to the through hole 23 of the anchor body 21a, and provided at its left and right end faces with recesses 24. Furthermore, a mark 25 applied with paint is provided at an upper left corner of the front face of the molded plastic product 21b.

A compression spring 26 is disposed in each of the recesses 24 formed in the seat belt anchor 21. The spring 26 has an upper end thereof abutting against a recess-defining face, on the upper side, of the seat belt anchor 21. A lower end of the spring 26 abuts against the projection 13a of the fitting member 13. Thus, the cover 11 is urged downward by the spring force of the spring 26.

As mentioned below, the cover 11 assumes its lowermost position when no tension force is applied to the seat belt 1. In the lowermost position, the projection 13a of the fitting member 13 abuts against a recess-defining face, on the lower side, of the seat belt anchor 21. When a tension force is applied to the seat belt 1, the cover 11 is moved upward against the spring force of the spring 26. In this manner, as the tension force applied to the seat belt 1 increases, the spring 26 is compressed to decrease the distance between the opposite ends of the spring, which distance determines the relative position between the cover 11 and the seat belt anchor 21. Thus, the relative position varies with the increase in the tension force.

The fitting member 13 fitted to the through hole 14 of the cover 11 cooperates with the spring 26 to constitute engagement means 31 through which the cover 11 and the seat belt anchor 21 are engaged to each other so that their relative position may vary.

As already explained, the mark 25 is provided at an upper left corner of the front face of the molded plastic product 21b of the seat belt anchor 21 and the through hole 15 is provided at a lower left corner of the front wall of the cover 11. When the seat belt 1 is applied with no tension force, the cover 11 assumes its lowermost position so that the mark 25 is located above the through hole 15. Thus, the mark 25 is hidden by the front wall of the cover 11. On the other hand, when the seat belt 1 is applied with a sufficient tension force, the cover 11 moves upward with respect to the seat belt anchor 21 to establish a positional relation such that the mark 25 and the through hole 15 are vertically aligned to each other. As a result, the mark 25 is made visible from exterior through the through hole 15.

The mark 25 cooperates with the through hole 15 to constitute relative-position indicating means 32 for indicating the relative position between the seat belt anchor 21 and the cover 11.

For assemblage of the connector assembly, an upper half of the seat belt anchor 21 is inserted into the cover 11 through a lower opening of the cover 11. Then, the recesses 24 of the seat belt anchor 21 and the through holes 14 of the cover 11 are brought to be in alignment with one another, and the springs 26 are fitted into the recesses 24 through the through holes 14. Next, the fitting members 13 are fitted to the through holes 14 of the cover 11, with the lower ends of the springs 26 abutted against the projections 13a of the fitting members 13.

Figure 2:
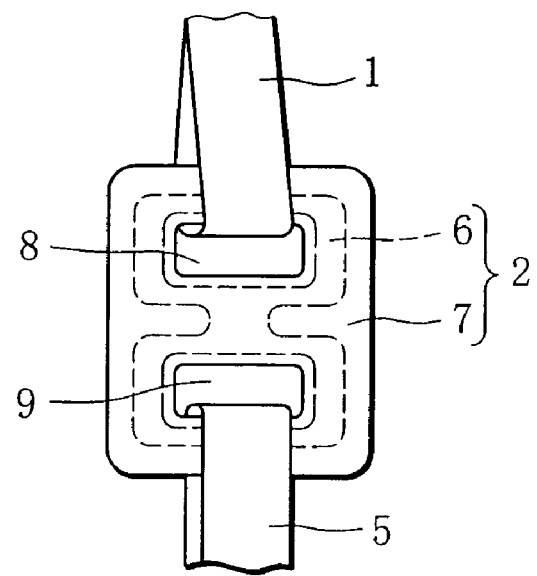
FIG. 2 is an enlarged front view of the conventional connector assembly shown in FIG. 1.

The connector assembly thus assembled is fixed to a passenger seat with use of a fastening belt 5 as shown in FIGS. 6–11, as in the case of the assembly shown in FIG. 2. Next, an operator causes the cover 11 to move upward against the spring forces of the springs 26 such that the seat-belt insertion hole 22 of the seat belt anchor 21 is in alignment with the seat-belt insertion holes 12 formed in the front and rear walls of the cover 11. In this state, the operator causes the seat belt 1 to pass through the seat-belt insertion holes 12 and 22, as shown in FIGS. 6–11.

In the following, the operation of the seat belt connector assembly will be explained.

To utilize the seat belt 1 to protect a passenger, a seated passenger pulls the seat belt 1 to extend the seat belt from the retractor toward the front of the passenger torso, and couples the tongue plate of the seat belt 1 to the belt buckle. Then, the passenger adjusts the tension force of the seat belt by pulling the seat belt in the direction toward or away from the retractor, whereby the passenger is properly restrained to the seat by the seat belt.

In order to restrain a child seat (shown by reference numeral 30 in FIG. 1) in a passenger seat by the seat belt 1, a user places the child seat on the passenger seat, and then restrains the child seat in the passenger seat with use of the seat belt 1 in substantially the same manner as in the case of restraining a seated passenger. On this occasion, based on the indication given by the relative-position indicating means 32 of the connector assembly, the user makes a judgment as to whether or not the child seat is securely restrained in the passenger seat.

Figure 6:
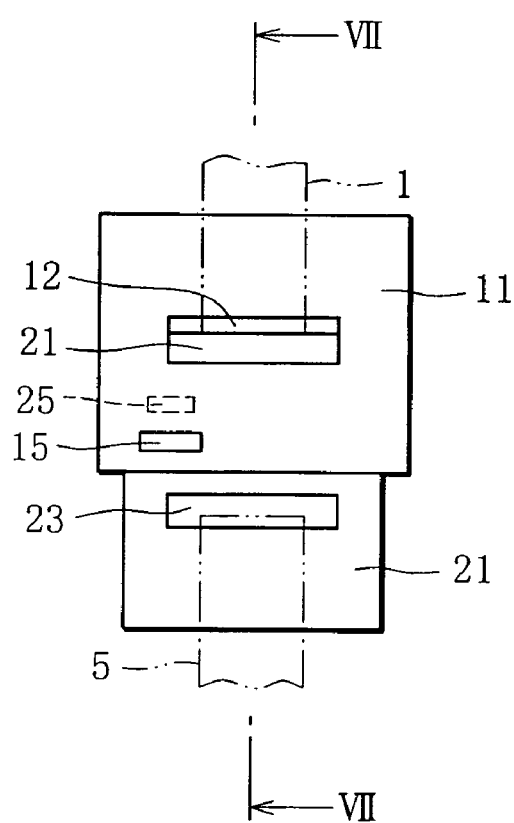
FIG. 6 is a front view showing the connector assembly in a state where no tension force is applied to the seat belt.
Figure 7:
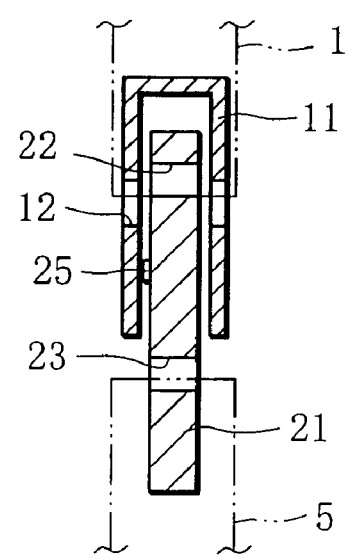
FIG. 7 is a section view of the connector assembly taken along the line VII—VII in FIG. 6.

As explained previously, when no tension force is applied to the seat belt 1, the cover 11 of the connector assembly is applied with only the spring forces of the springs 26 disposed in the connector assembly, so that the cover 11 assumes its lowermost position as shown in FIGS. 5–7. Thus, the mark 25 provided at an upper left corner of the front face of the seat belt anchor 21 is located above the through hole 5 formed at a lower left corner of the front wall of the cover 11 (see FIG. 6). As a result, the mark 25 is hidden by the front wall of the cover 11, and hence the user cannot see the mark 25 through the through hole 15 of the cover 11. In this case, the user determines that the seat belt 1 has not been applied with a sufficient tension force large enough to securely restrain the child seat in the passenger seat.

Thus, the user pulls the seat belt 1 toward the retractor to increase the tension force applied to the seat belt 1. Since the cover 11 assumes a position where equilibrium is established between the tension force of the seat belt 1 and the spring forces of the springs 26, the seat belt 1 moves upward to be brought in contact with the seat-belt insertion hole defining face, on the upper side, of the cover 11 as the tension force increases.

Figure 8:
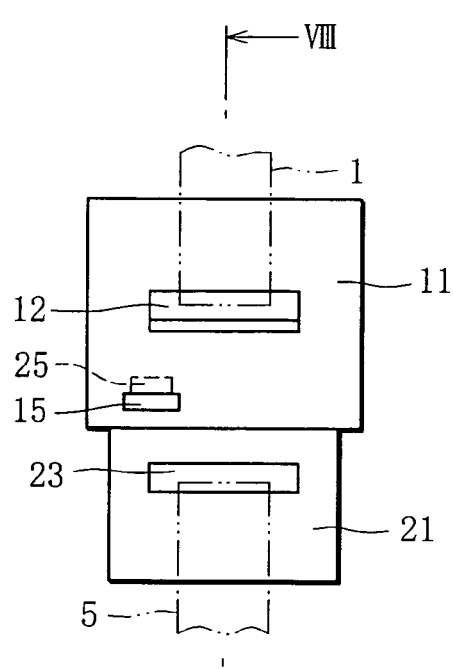
FIG. 8 is a front view showing the connector assembly in a state where a small tension force is applied to the seat belt.
Figure 9:
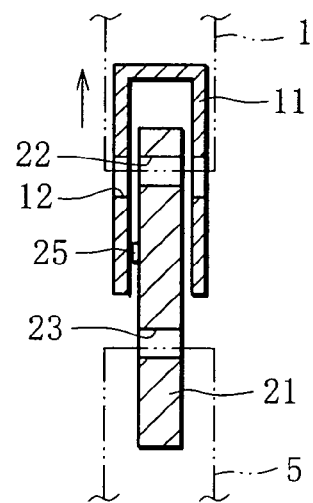
FIG. 9 is a section view of the connector assembly taken along the line IX—IX in FIG. 8.

Subsequently, as the tension force applied to the seat belt 1 increases, the cover 11 is gradually moved upward by the seat belt 1 against the spring forces of the springs 26. Thus, the through hole 15 formed in the front wall of the cover 11 moves upward so as to be closer to the mark 25 formed in the front face of the seat belt anchor 21. If the desired tension force has not been reached as yet, the mark 25 is kept invisible (FIG. 8).

Figure 10:
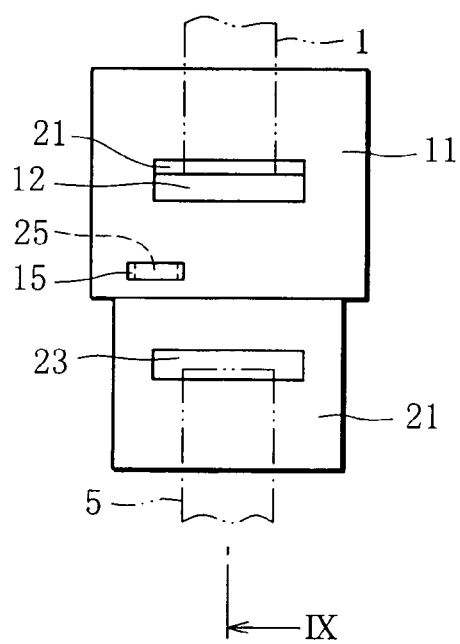
FIG. 10 is a front view showing the connector assembly in a state where a sufficient tension force is applied to the seat belt.
Figure 11:
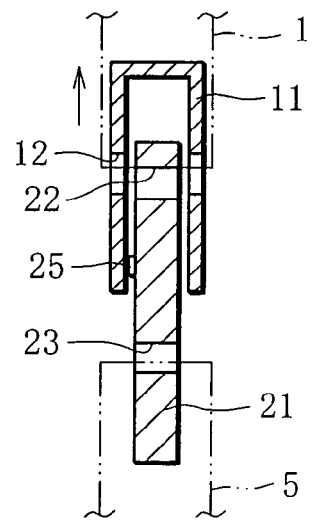
FIG. 11 is a sectional view of the connector assembly taken along the line XI—XI in FIG. 10.

Thus, the user further increases the tension force of the seat belt 1. Hence, the seat belt 1 is further moved upward together with the cover 11, and is brought in contact with the seat-belt insertion hole defining face, on the upper side, of the seat belt anchor 21. At this time, the tension force of the seat belt 1 reaches the desired tension force large enough to securely restrain the child seat, and the through hole 15 of the cover 11 is at the same height as the mark 25 of the seat belt anchor 21. As a consequence, the mark 25 is made visible through the through hole 15, as shown in FIG. 10.

When confirming that the mark 25 is visible, the user determines that the seat belt 1 is applied with the desired tension force large enough to permit the child seat to be securely restrained by the seat belt in the passenger seat. Thus, the user stops pulling the seat belt 1 toward the retractor, thereby maintaining the seat belt applied with the desired tension force.

When the tension force applied to the seat belt 1 further increases to be greater than the desired tension force, the tension force of the seat belt 1 is mainly sustained by the seat belt anchor 21. Since the seat belt anchor 21 is coupled to the passenger seat through the fastening belt 5 that is stiff enough to carry the increased tension force, the safety of the connector assembly is ensured even if the desired tension force is exceeded.

As explained in the above, the seat belt connector assembly of this embodiment permits the user to make an easy judgement as to whether or not the child seat has been securely restrained by the seat belt in the passenger seat by determining whether the mark 25 can be seen through the through hole 15. Thus, the child seat can be securely restrained by increasing the tension force of the seat belt until the mark 25 becomes visible.

The present invention is not limited to the foregoing embodiment and may be modified variously.

For example, the embodiment has dealt with a seat belt connector assembly that is connected to one end of a seat belt on the seat-cushion side. However, the present invention is applicable to another type of connector assembly connected to any appropriate part of a seat belt such as an intermediate portion thereof to which a tongue plate is attached.

In stead of a compression spring, a tension spring may be employed to engage the cover and the seat belt anchor for relative motion.

In the embodiment, relative-position indicating means for indicating the relative position between a seat belt anchor and a cover is comprised of a mark provided in the seat belt anchor and a through hole formed in the cover. However, the indicating means is not limited to such an arrangement.

Figure 12:
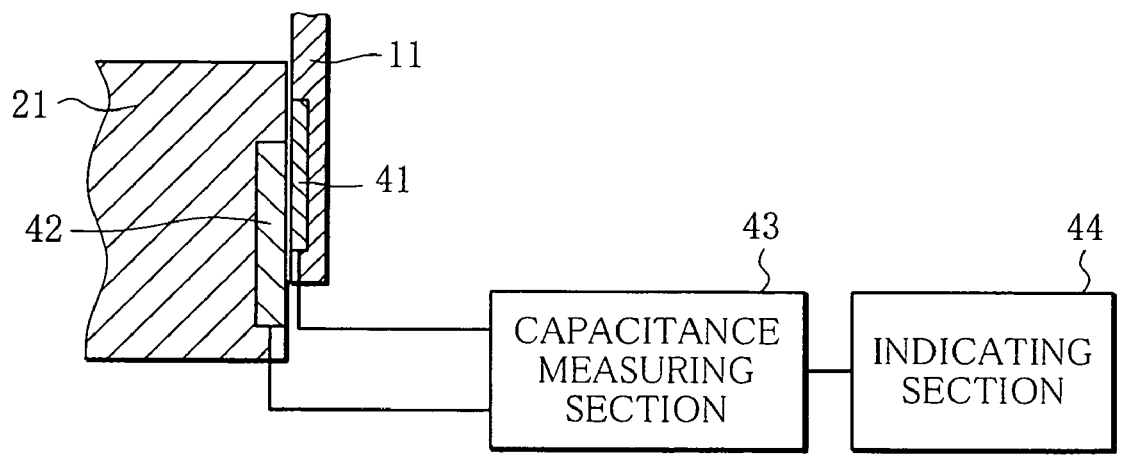
FIG. 12 is a schematic view of relative-position indicating means according to a modification of the present invention.

FIG. 12 shows a relative-position indicating means according to a modification of this invention. In FIG. 12, reference numerals 41 and 42 individually denote electrodes provided in opposed faces of a cover 11 and a seat belt anchor 21, and a reference numeral 43 denotes a capacitance measuring section comprised of an electronic circuit for detecting the capacitance between the electrodes 41, 42. As the relative position between the cover 11 and the seat belt anchor 21 varies with the change in tension force applied to a seat belt, the capacitance is detected by the capacitance measuring section 43. When detecting that the desired capacitance is reached, the capacitance measuring section 43 determines that the desired tension force for the seat belt is reached and hence the desired relative position is established between the cover 11 and the seat belt anchor 21, and actuates an indicating section 44 such as an indication lamp, whereby a user is notified that the desired tension force is reached.

Figure 13:
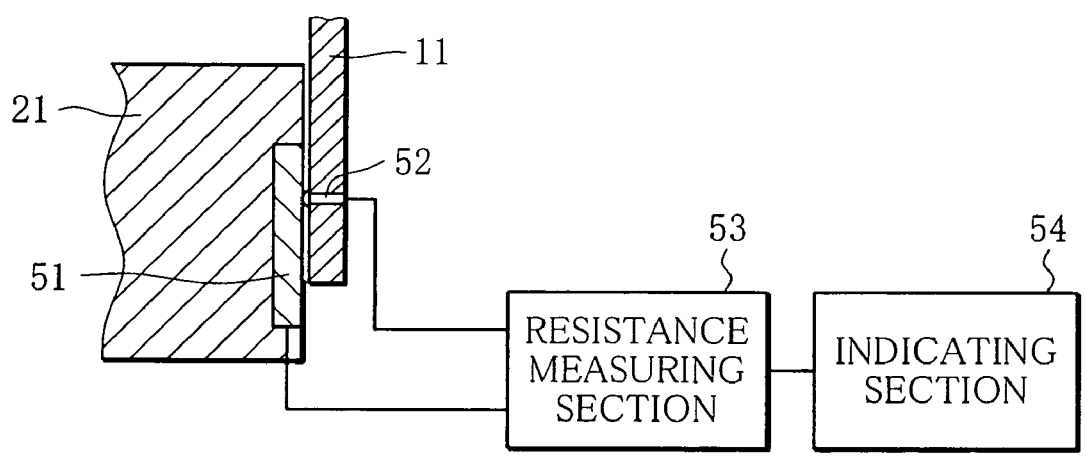
FIG. 13 is a schematic view of relative-position indicating means according to another modification of this invention.

In FIG. 13 showing relative-position indicating means according to another modification of the present invention, reference numerals 51 and 52 denote a resistor and a sliding contact which are individually provided as electric elements in opposed faces of a cover 11 and a seat belt anchor 21. A reference numeral 53 denotes a resistance measuring section for detecting the resistance between one end of the resistor 51 and the sliding contact 52. With the change in tension force of a seat belt, there occur changes in the relative position between the cover 11 and the seat belt anchor 21 and in the resistance between the resistor 51 and the sliding contact 52. When determining that the desired resistance is reached, the resistance measuring section 53 determines that the desired tension force is reached and drives an indicating section 54.

The relative-position indicating means shown in FIG. 13 may be further modified so that electric contacts (not shown) are provided as electric elements in opposed faces of the cover 11 and the seat belt anchor 21. These electric contacts are brought in contact with each other to cause an indication lamp to be turned on when the desired tension force for a seat belt is reached to establish the desired relative position between the cover 11 and the seat belt anchor 21.

Figure 14:
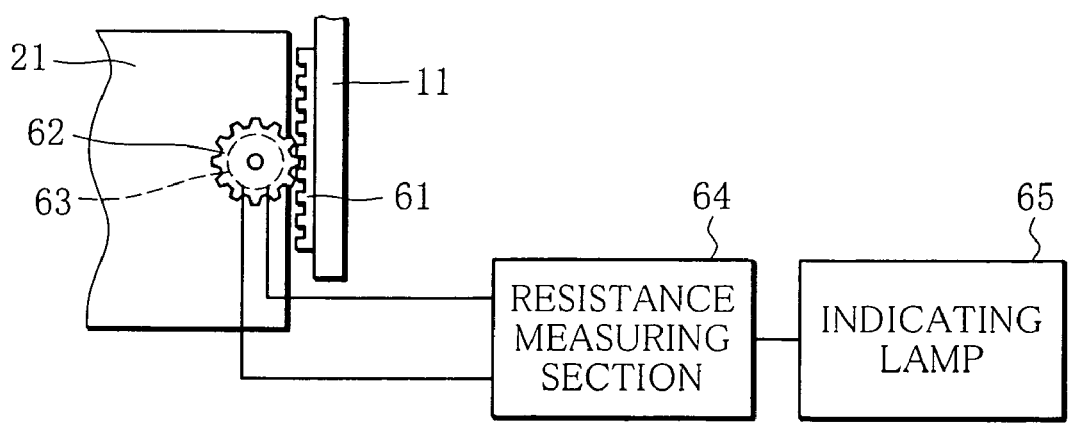
FIG. 14 is a schematic view of relative-position indicating means according to a further modification of this invention.

FIG. 14 shows relative-position indicating means according to a further modification of the present invention, which comprises a toothed rack 61 and a pinion gear 62 meshing therewith which are provided as mechanical elements in opposed faces of the cover 11 and the seat belt anchor 21. As the cover 11 moves upward, the rotary shaft of a variable resistor 63 rotates in unison with the pinion gear 62 to change the resistance of the variable resistor 63. When detecting that the desired resistance is reached, a resistance measuring section 64 determines that the desired tension force for a seat belt is reached to turn on an indication lamp 65.

In the above-described embodiment, the relative-position indicating means is configured to indicate that the desired relative position is reached, at which the desired tension force large enough to restrain a child seat in a passenger seat is generated. Alternatively, the indicating means may be configured to indicate that another desired relative position where a tension force properly restraining a seated passenger to a seat is generated is reached, in combination with or instead of the indication in the embodiment.

Further, the relative position generating the desired tension force for a seat belt is not limited to the position explained in the embodiment. For example, the desired tension force may be reached before the seat belt abuts against the seat-belt insertion hole defining face of the seat belt anchor.

In other respects, the present invention may be modified within the inventive concept of this invention.

What is claimed is:

1. A seat belt connector assembly, comprising:
   a seat belt anchor adapted to be coupled to a passenger seat, said seat belt anchor having a seat-belt insertion hole permitting a seat belt to pass therethrough;
   a cover for accommodating at least part of said seat belt anchor so that said seat belt anchor and said cover are relatively movable, said cover having a seat-belt insertion hole which is permitted to be aligned with the seat-belt insertion hole of said seat belt anchor and which permits the seat belt to pass therethrough; and
   relative-position indicating means for indicating a relative position between said seat belt anchor and said cover, the relative position varying with a change in a tension force applied to the seat belt, wherein said relative-position indicating means indicates the relative position in accordance with an electrical change between electrodes individually formed in opposed faces of said seat belt anchor and said cover.

2. The assembly of claim 1, wherein the electrical change comprises a change in capacitance between the electrodes.

3. The assembly of claim 1, wherein the electrical change comprises a change in resistance between the electrodes.

4. A seat belt connector assembly, comprising:
   a seat belt anchor adapted to be coupled to a passenger seat, said seat belt anchor having a seat-belt insertion hole permitting a seat belt to pass therethrough;
   a cover for accommodating at least part of said seat belt anchor so that said seat belt anchor and said cover are relatively movable, said cover having a seat-belt insertion hole which is permitted to be aligned with the seat-belt insertion hole of said seat belt anchor and which permits the seat belt to pass therethrough; and
   an indicator configured to show a relative position between said seat belt anchor and said cover, the relative position varying with a change in a tension force applied to the seat belt, wherein said indicator showing the relative position in accordance with an electrical change between electrodes individually formed in opposed faces of said seat belt anchor and said cover.

5. The assembly of claim 4, wherein the electrical change comprises a change in capacitance between the electrodes.

6. The assembly of claim 4, wherein the electrical change comprises a change in resistance between the electrodes.

* * * * *